(12) United States Patent
Edwards

(10) Patent No.: US 9,233,632 B2
(45) Date of Patent: Jan. 12, 2016

(54) HEAD RESTRAINT SYSTEM

(71) Applicant: Allan Milton Edwards, Dorchester, MA (US)

(72) Inventor: Allan Milton Edwards, Dorchester, MA (US)

( * ) Notice: Subject to any disclaimer, the term of this patent is extended or adjusted under 35 U.S.C. 154(b) by 258 days.

(21) Appl. No.: 13/927,171

(22) Filed: Jun. 26, 2013

(65) Prior Publication Data

US 2015/0001904 A1    Jan. 1, 2015

(51) Int. Cl.
*B60N 2/48* (2006.01)
*A42B 3/04* (2006.01)
*B60R 21/00* (2006.01)
*B60R 21/02* (2006.01)

(52) U.S. Cl.
CPC ............ *B60N 2/4885* (2013.01); *B60N 2/4879* (2013.01); *A42B 3/0473* (2013.01); *B60R 2021/0048* (2013.01); *B60R 2021/022* (2013.01)

(58) Field of Classification Search
CPC .............. B60N 2/4879; B60N 2/4885; B60R 2021/0048; B60R 2021/022; A42B 3/0473
USPC .......................................................... 297/393
See application file for complete search history.

(56) References Cited

U.S. PATENT DOCUMENTS

| | | | | |
|---|---|---|---|---|
| 5,378,042 A * | 1/1995 | Daneshvar | ............... | 297/393 |
| 5,511,854 A * | 4/1996 | Cordia | ............... | 297/393 |
| 5,658,245 A * | 8/1997 | McGinnis et al. | ............... | 602/32 |
| 6,209,959 B1 * | 4/2001 | Meye | ............... | 297/393 |
| 6,607,245 B1 * | 8/2003 | Scher | ............... | 297/393 |
| 6,799,802 B1 * | 10/2004 | Moran | ............... | 297/393 |
| 7,125,415 B1 * | 10/2006 | Hudgens | ............... | 606/241 |
| 7,246,853 B2 | 7/2007 | Harcourt et al. | | |
| 7,628,456 B1 * | 12/2009 | Swartz | ............... | 297/464 |
| 7,740,318 B2 * | 6/2010 | Funke et al. | ............... | 297/393 |
| 7,832,802 B2 * | 11/2010 | Ehlers et al. | ............... | 297/393 |
| 8,007,044 B1 * | 8/2011 | Dubey et al. | ............... | 297/392 |
| 8,141,955 B1 * | 3/2012 | Maassarani | ............... | 297/393 |
| 8,287,045 B1 * | 10/2012 | Donohue et al. | ............... | 297/393 |
| 2002/0067063 A1 * | 6/2002 | Taborro | ............... | 297/397 |
| 2005/0268377 A1 * | 12/2005 | Massey | ............... | 2/209.13 |
| 2006/0082205 A1 | 4/2006 | Hobson | | |
| 2010/0237675 A1 * | 9/2010 | Merritt | ............... | 297/393 |
| 2010/0308630 A1 * | 12/2010 | Davis | ............... | 297/250.1 |
| 2011/0043025 A1 * | 2/2011 | Park | ............... | 297/393 |
| 2012/0068515 A1 * | 3/2012 | Bogen | ............... | 297/393 |
| 2012/0096626 A1 * | 4/2012 | Edwards | ............... | 2/209.13 |

* cited by examiner

*Primary Examiner* — David R Dunn
*Assistant Examiner* — Tania Abraham
(74) *Attorney, Agent, or Firm* — Schmeiser, Olsen & Watts LLP

(57) ABSTRACT

Described is a system for restraining a head of a person. The system comprises headwear having an outer surface and an opening that exposes an interior surface configured to receive the head of a wearer of the headwear, a flexible restraining device having a first end and a second end, each of the first and second ends coupled to the headwear, and a central portion between the two ends, an opening between the restraining device and the headwear, and a vertical support member coupled extending through the opening. The restraining device accommodates the vertical support member holds the headwear in place relative to the vertical support member.

9 Claims, 10 Drawing Sheets

HEAD RESTRAINT SYSTEM

RELATED APPLICATIONS

This application is related to U.S. Pat. No. 8,381,316, entitled "Head Apparel," and U.S. patent application Ser. No. 13/756,109 filed Jan. 31, 2013, entitled "Head Apparel," the entirety of each of which is incorporated by reference herein.

FIELD OF THE INVENTION

The present invention relates generally to head apparel, and more specifically, to an apparatus and method for stabilizing the head of a person relative to a seat.

BACKGROUND

It is well known that people often enjoy sleeping in their seats while traveling in an airplane, train, automobile, or other mode of transportation. However, it is difficult for a person to sleep in his or her seat when the back portion of the seat is in an upright position or reclined position. Thus, it is difficult for a traveler to be comfortable when attempting to sleep, especially because a traveler's head is not stabilized while in an upright position. As a result, the traveler's head can fall forward during sleep.

Travelers often attempt to lean their heads against a stationary object such as a window, or rely on a pillow placed between the head and the back surface of the seat for comfort. However, when the head is not secured against the stationary object, the traveler's head is subject to abrupt movement during sleep.

Children travelers are typically secured in a booster seat. However, many seat belts or related restraint systems are not adapted for children. A child's head is also subject to abrupt movement during sleep, regardless of whether the child is secured in a booster seat or directly secured against a car seat. The head is the heaviest part of the body and when people are asleep their neck muscles become relaxed, causing the head to bob and weave uncontrollably.

SUMMARY

In one aspect, the invention features a system for restraining a head of a person, comprising: headwear having an outer surface and an opening that exposes an interior surface configured to receive the head of a wearer of the headwear; a flexible restraining device having a first end and a second end, each of the first and second ends coupled to the headwear, and a central portion between the two ends; an opening between the restraining device and the headwear; and a vertical support member coupled extending through the opening. The restraining device accommodates the vertical support member and holds the headwear in place relative to the vertical support member.

In another aspect, the invention features a system for restraining a head of a person, comprising: headwear having an outer surface and an opening that exposes an interior surface configured to receive the head of a wearer of the headwear; a first strap and a second strap, each extending from a side of the headwear, each strap including a fastening device; and a seat comprising a first anchor and a second anchor constructed and arranged to receive the first and second straps, respectively, the first and second straps removably coupled to the first and second anchors holding the headwear in place relative to the seat.

In another aspect, the invention features a system for restraining a head of a person, comprising: headwear having an outer surface and an opening that exposes an interior surface configured to receive the head of a wearer of the headwear; a first anchor and a second anchor, each extending from a surface of the headwear; and a seat comprising at least one strap that extends from the seat, the at least one strap including a fastening device, the first and second straps removably coupled to the first and second anchors holding the headwear in place relative to the seat.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Figure 1:
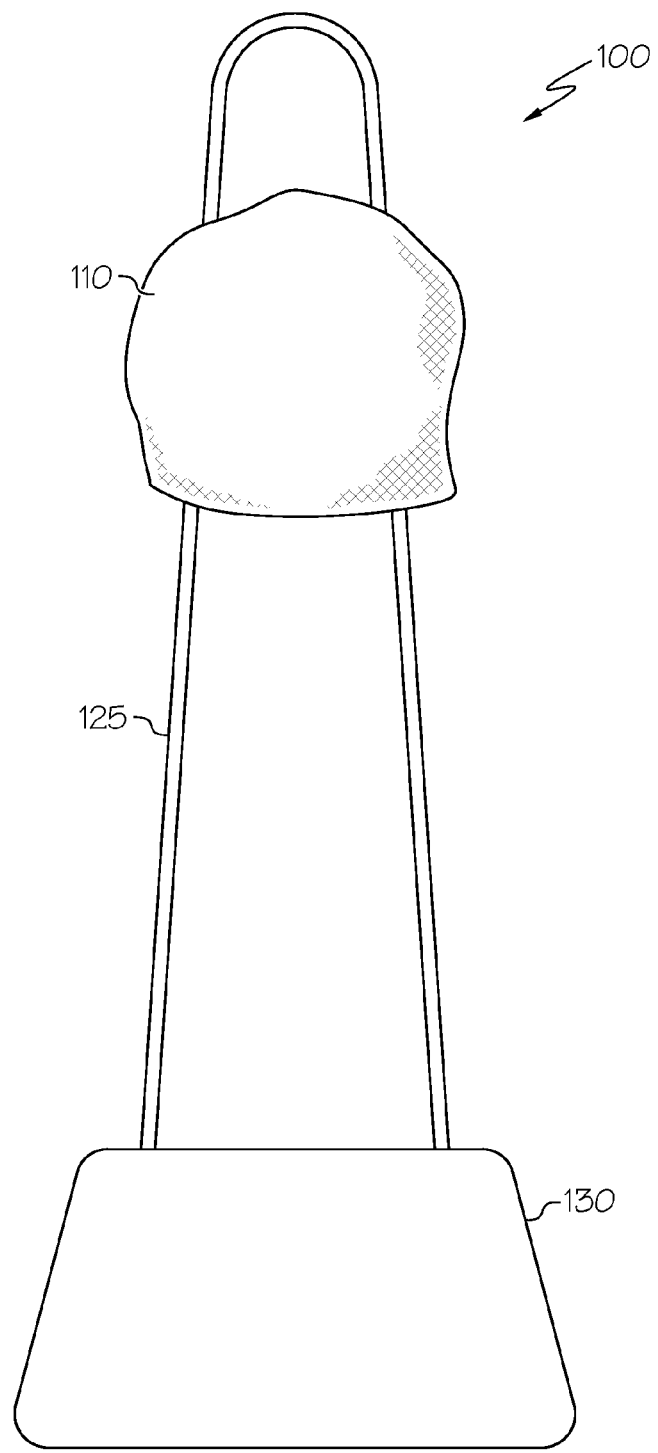
FIG. 1 is a front view of a system for restraining a head of a wearer, in accordance with an embodiment.

In the following description, specific details are set forth although it should be appreciated by one of ordinary skill that the present invention can be practiced without at least some of the details. In some instances, known features or processes are not described in detail so as not to obscure the present invention.

The present teaching will now be described in more detail with reference to exemplary embodiments thereof as shown in the accompanying drawings. While the present teaching is described in conjunction with various embodiments and examples, it is not intended that the present teaching be limited to such embodiments. On the contrary, the present teaching encompasses various alternatives, modifications and equivalents, as will be appreciated by those of skill in the art. Those of ordinary skill having access to the teaching herein will recognize additional implementations, modifications and embodiments, as well as other fields of use, which are within the scope of the present disclosure as described herein.

Embodiments of head apparel described herein include a restraining device coupled to headwear, headgear, or the like, such as a baseball cap, winter hat, helmet, and so on. Thus, the head apparel can be worn by a person as part of a wardrobe or for other purposes such as for protecting the person's head from sunburn or cold weather. In addition to wearing the head apparel for purposes of fashion or head protection, the head apparel can be worn to allow the wearer to sleep when seated when traveling in an automobile, train, or airplane.

The restraining device, when expanded, can be positioned about a stationary object, in particular, a support member extends in a substantially vertical direction from a base that provides stability to the vertical support member. The base and vertical support member of the head restraint system can be positioned at a car seat, booster seat, high chair, swing seat, or other sitting device constructed and arranged to provide a safe sitting arrangement for a child, handicapped person, elderly person, or other person requiring head support to reduce the risk of injury during movement, for example, in a car, train, airplane, swingset, and so on. Alternatively, a car seat, booster seat, or other sitting apparatus can serve as a base. Here, a support member can be integral with, and extend from the car seat, booster seat, or related sitting apparatus. The restraining device stabilizes the person's head, more specifically, a child's head, against the surface of the vertical support member mechanism, and or a headrest or back of a seat so as to prevent the head from movement during sleep or other period of inactivity. Here, a person's head is held in place when the neck muscles are relaxed, for example, when the person is nodding off. The head restraint can provide comfort for a traveler while sleeping in an upright position. Other applications of the head restraint system in accordance with some embodiments can include the use by people with neck or back injuries, who cannot use their neck muscles effectively to hold their heads in an upright position, regardless of whether or not such people are awake or asleep.

Figure 2:
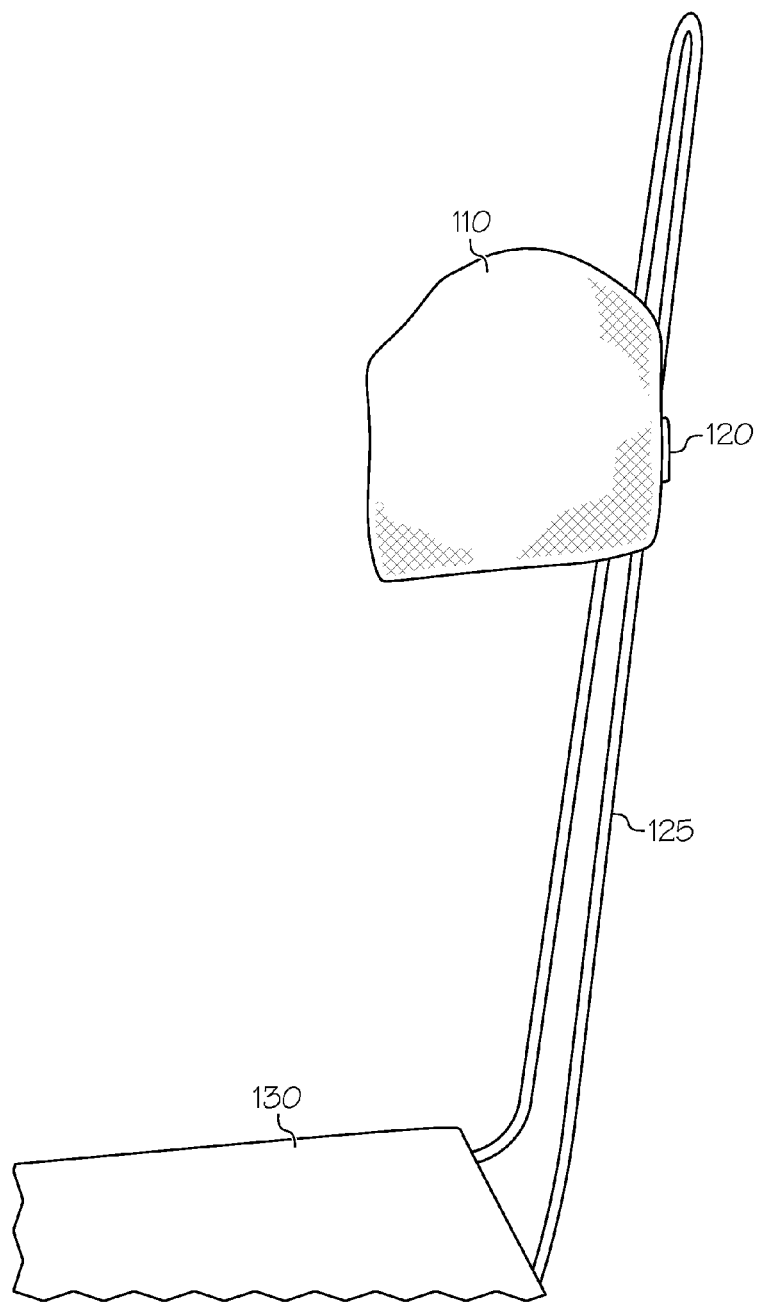
FIG. 2 is a side view of the system of FIG. 1.
Figure 3:
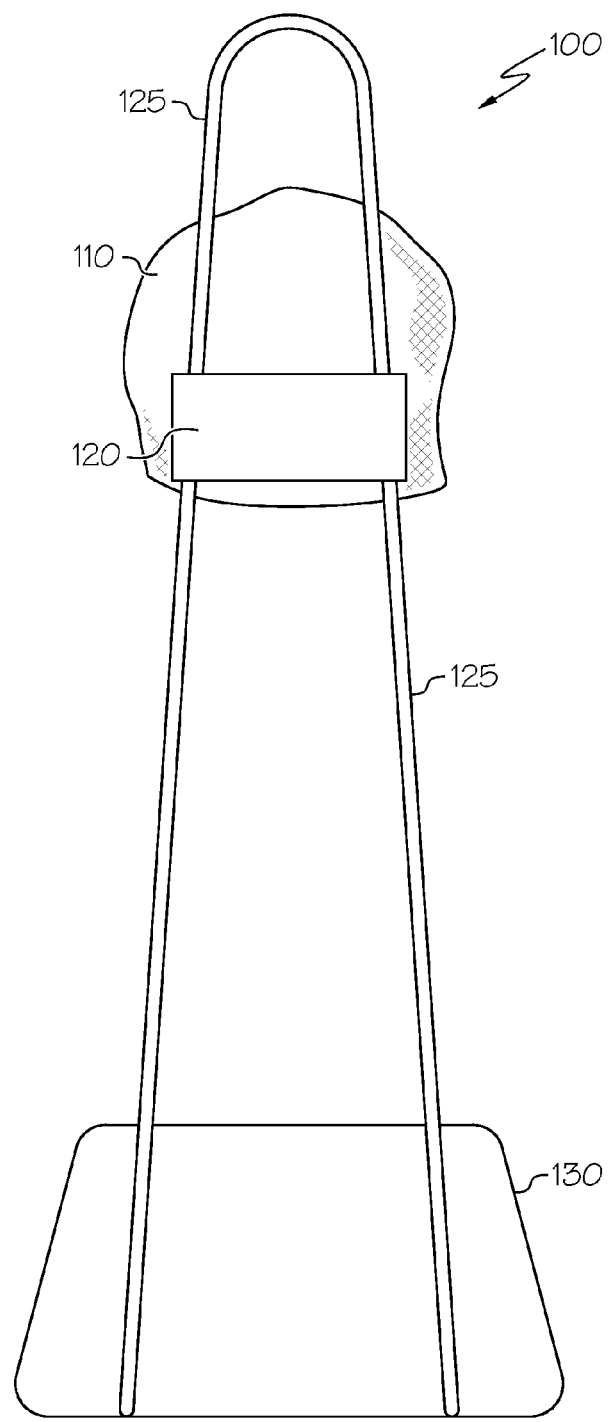
FIG. 3 is a rear view of the system of FIGS. 1 and 2.
Figure 4:
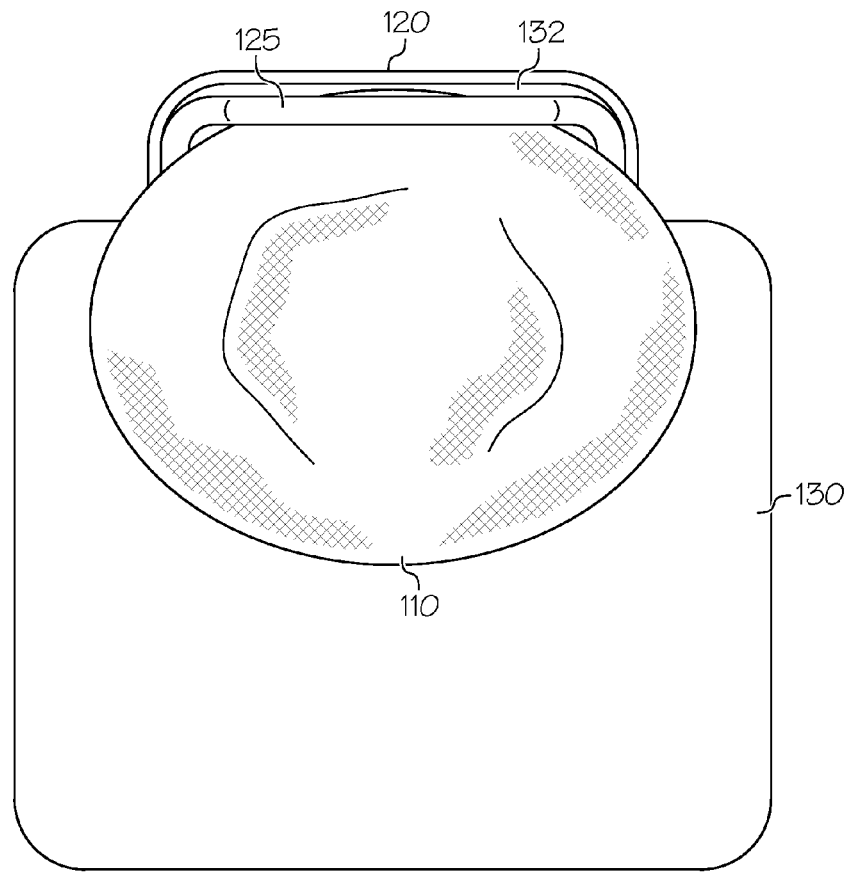
FIG. 4 is a top view of the system of FIGS. 1-3.

FIG. 1 is a front view of a system 100 for restraining a head of a wearer, in accordance with an embodiment. FIG. 2 is a side view of the system 100 of FIG. 1. FIG. 3 is a rear view of the system 100 of FIGS. 1 and 2. FIG. 4 is a top view of the system 100 of FIGS. 1-3.

In an embodiment, the system 100 includes headwear 110, a restraining device 120, and a support member 125. The system 100 can also include an optional base 130.

The headwear 110 is adapted for positioning on a wearer's head. In an embodiment, the headwear 110 is of a conventional construction well-known to those of ordinary skill in the art, for example, a commercially available cap, hat, or other head apparel. Alternatively, the headwear 110 can be, but not limited to helmets, visors, headbands, or other head coverings or headgear known to those or ordinary skill in the art as conformably fitting about at least a portion of the wearer's head. The headwear 110 has an interior surface configured for receiving the wearer's head. In an embodiment, the headwear 110 is formed of soft and compliant materials such as cotton, wool, or acrylic, for substantially conforming to at least a portion of the wearer's head. The inner surface can be formed of one material and the other surface can be formed of another material, or the inner and outer surfaces can be formed of the same material. In another embodiment, the outer surface has a rigid shell, for example, a helmet, and the interior surface includes a compliant material, such as a foam liner, for substantially conforming to at least a portion of the wearer's head. In other embodiments, the headwear 110 is similar or the same as headwear described in U.S. Pat. No. 8,381,316 and/or U.S. patent application Ser. No. 13/756,109, each incorporated by reference herein.

The restraining device 120 is adapted to restrain the wearer's head to the vertical support member 125. The restraining device 120 can have a first end coupled to a first region of the headwear 110, for example, at a back of the headwear 110, and a second end coupled to a second region of the headwear 110, for example, also at the back of the headwear 110. Alternatively, the first and second ends can be each attached to the outer front or side surfaces of the headwear 110, and extend to the back for positioning about the support member 125. In some embodiments, the ends of the restraining device 120 are directly or indirectly attached to the outer surface of the headwear 110 using staples, sewing materials such as thread, buttons, snaps, zippers, clasps, buckles, slides, closures, adjusters, rings, rivets, Velcro®, or other fasteners known to those of ordinary skill in the art, for example, described in U.S. Pat. No. 8,381,316 and/or U.S. patent application Ser. No. 13/756,109, each incorporated by reference herein. In other embodiments, the ends of the restraining device 120 can be coupled to the interior surface of the headwear 110, and extend through openings in the headwear 110 so that a length of the restraining device 220 is external to the headwear 110. As shown in FIG. 4, an opening 132 can be between the restraining device 120 and the outer surface of the headwear 110 for conformably receiving the vertical support member 125. The length of the restraining device 220 forming the opening 132 can be adjusted, so that the size of the opening 132 can be enlarged or reduced, by one or more of the abovementioned fasteners. For example, the restraining device 120 can be in communication with a metal pacifier clip, a suspender clip, an adjustable buckle, a slide, or related fastener for increasing or decreasing a length of the restraining device 120, or a restraining device of other head apparel referred to herein. For example, a central portion or end of the restraining device 120 can be inserted into an eye opening of a clip. The fastener can include teeth, a hook, pin, button, or other device or slip prevention mechanism for preventing the length of the restraining device 320 from changing after it is adjusted.

The restraining device 120 can be a strap, belt, rope, or other thin strip of fabric formed of materials that can accommodate a force, such as the weight of the wearer's head. By way of example, the restraining device 120 can be fabricated from leather, polymers, knitted fabrics, or other durable fabrics, or a combination thereof. Such restraining device materials can include elastic properties so that the restraining device 120 can conform with dimensions of the support member 125 when positioned about the support member 125, and permitting the restraining device 120 to expand beyond an initial state when a force is applied thereto, such as the weight of the wearer's head. In other embodiments, the restraining device can have inelastic properties. The features of the restraining device 120 provide for tension against the support member 125 and to hold the headwear in place relative to the vertical support member. The restraining device 120 is not intended to replace a seat belt. To the contrary, a seat belt, child harness, or related securing device can be provided that complements the restraining device 120. For example, a seat belt can be secured about a child's waist, torso, and chest, and the restraining device is positioned about the support member 125 to hold the child's head in relative place to prevent the child's head from sudden movement while nodding off while secured in the car seat or the like.

The restraining device 120 substantially restrains the vertical support member 125 against the surface of the headwear 110 so that the headwear 110 is between the wearer's head and the support member 125. In this manner, in the event of a collision or sudden braking of the vehicle in which the wearer is seated, the wearer's head can be held in place against the support member 125.

The restraining device 120 can be configured to include a safety device (not shown), such as a fastener, slide, buckle or related mechanism coupled between an end of the restraining device 120 and the headwear 110 that withstands a maximum force threshold, and that permits the restraining device 120 to be separated from the headwear 110 when a force is applied to the restraining device 120 that exceeds the maximum force threshold.

Elements of the system 100, for example, the restraining device 120, can be constructed and arranged to have customized dimensions, for example, different sizes, or adjustable so that one size fits all. Band adjustment of the restraining device 120 can either be made by manufacturing a set of apparatuses, each with different length bands, bands having different elastic properties, and different sizes and types of engaging members to accommodate different person types, and so on.

The support member 125 is constructed and arranged between the restraining device 120 and a surface of the headwear 110. In an embodiment, the support member 125 is flared as shown in FIG. 1. The support member 125 can include a taper, whereby a gradually increasing width of the support member 125 from the top of the support member 125 to a bottom of the support member 125 coupled to the base 130. Accordingly, the restraining device 120 can be constructed and arranged for positioning about a first width of the support member 125 with a sufficient elastic force, but is prohibited from "sliding" down the length of the support member 125 due to friction and/or the increasing width of the support member 125. In other embodiments, the support member 125 is U-shaped, wherein each end of the support member 125 is coupled to the base 130, a frame of a booster seat, or a child's car seat, or other sitting apparatus, for example, a sitting apparatus constructed and arranged to prevent injury in a sudden stop. The support member 125 can be tapered as described above, or the two portions of the support member 125 can be of a same width along a length of the support member 125. Here, the restraining device 120 can be prevented from sliding down the length of the support member 125 due to materials of the restraining device 120 and/or the support member 125 having properties that permit friction to occur. In another embodiment, the support member 125 includes at least one rod that extends vertically from the base 130, frame of a booster seat, or the like, for example, extending from the back of a child's car seat. The support member 125 can include a flexible or rigid or non-flexible strap or the like. The support member 125 can include a clip or other fastening device on each end of the strap or the like. In this manner, the strap or the like can be attached to the headwear 110.

The support member 125 can extend vertically along a back portion of a travel seat or other stationary object, such that the restraining device 120 extends substantially horizontally around the support member 125 to hold the head of a person wearing the headwear 110 in place against the back portion of the travel seat of other stationary object. In some embodiments, the support member 125 extends in a direction that is tangential to a vertical axis. A hinge or related mechanism (not shown) or a bendable portion of the support member 125 can be adjusted so that the support member 125 reclines or otherwise is changed to position other than a vertical position.

In an embodiment, an upper portion of the support member 125 extends through the opening between the restraining device 125 and the headwear 110 and abuts the ends of the restraining device 120 coupled to the headwear 110. The properties of the restraining device 120, for example, elastic or non-elastic properties, permit the restraining device 125 to apply a force around the upper portion of the support member 125 so that the headwear 110 and the restraining device 120 are collectively adapted to restrain the wearer's head to the vertical support member 125 when the wearer is seated.

The base 130 can be mounted to the distal end of vertical support member 125. The base can be configured as a plate or related element having a flat surface from which the vertical support member 125 can extend. The base 130 can be formed of well-known materials such as wood, plastic, composites, and so on. In other embodiments, the base 130 can be a seat of a sitting apparatus such as a booster seat. The dimensions of the base 130 are such that the base has a width and/or length that is larger, the same as, or less than that of the travel seat or other stationary object on which the base 130 is positioned. The base 130 can be positioned at, for example, on or under, a seat surface, for example, as shown in FIG. 5, on a booster seat.

Figure 5:
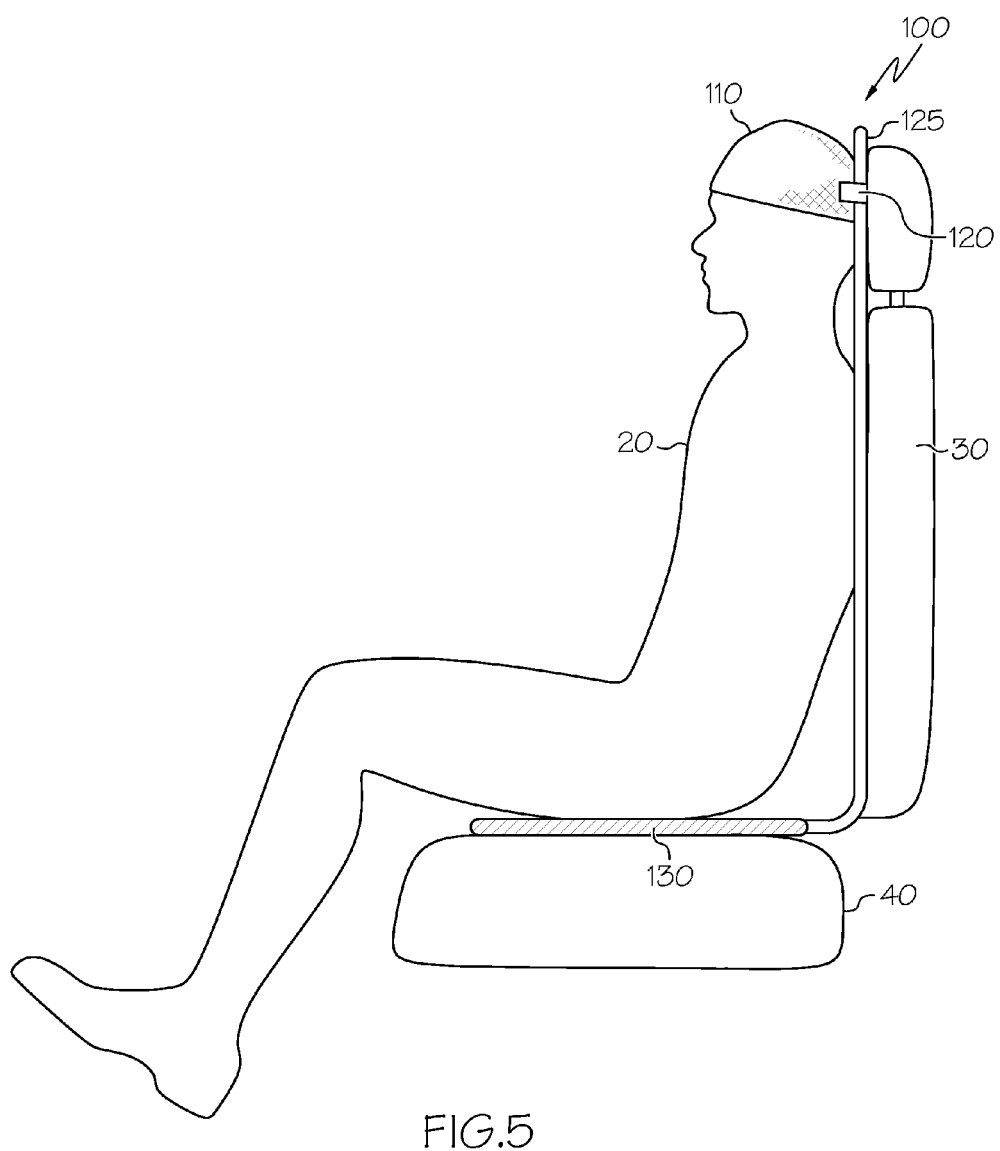
FIG. 5 is an illustrative view of a person secured to a seat by a head restraint system, in accordance with an embodiment.

FIG. 5 is an illustrative view of a person secured to a seat by a head restraint system 100, in accordance with an embodiment. The headwear 110 and the restraining device 120 of the head apparel 100 are collectively adapted to restrain the head of a person 20 wearing the head apparel attached to a stationary object such as a travel seat 30 when the wearer 20 is seated. The travel seat 30 can be a child car seat or booster seat, or a conventional car seat. The restraining device 120 is secured about an upper portion of a vertical support member 125 that extends from a base 130 positioned on a seat portion 40 of a travel seat 30 such that the restraining device 120 extends substantially horizontally around the support member 125 and the head of a wearer 20. The restraining device 120 can be positioned anywhere along the length of the support member 125 so that people, for example, a child 20, of a different height or other dimensions can utilize the system 100. For example, a child smaller than the child 20 shown in FIG. 5 can be positioned on the travel seat 30, whereby the restraining device 120 can be positioned at a lower region of the support member 125 than that shown in FIG. 5.

As described above, the support member 125 is coupled to and extends from the base 130. In this manner, when the child 20 is seated in the seat 30, his weight provides a force against the base 130, which can create stability for the support member 125, for example, minimize a lateral movement of the support member 125. The support member 125 can extend vertically, or extend in a direction tangential to a vertical axis, for example, extend in a direction permitting a person seated on the base to be reclined.

Figure 6:
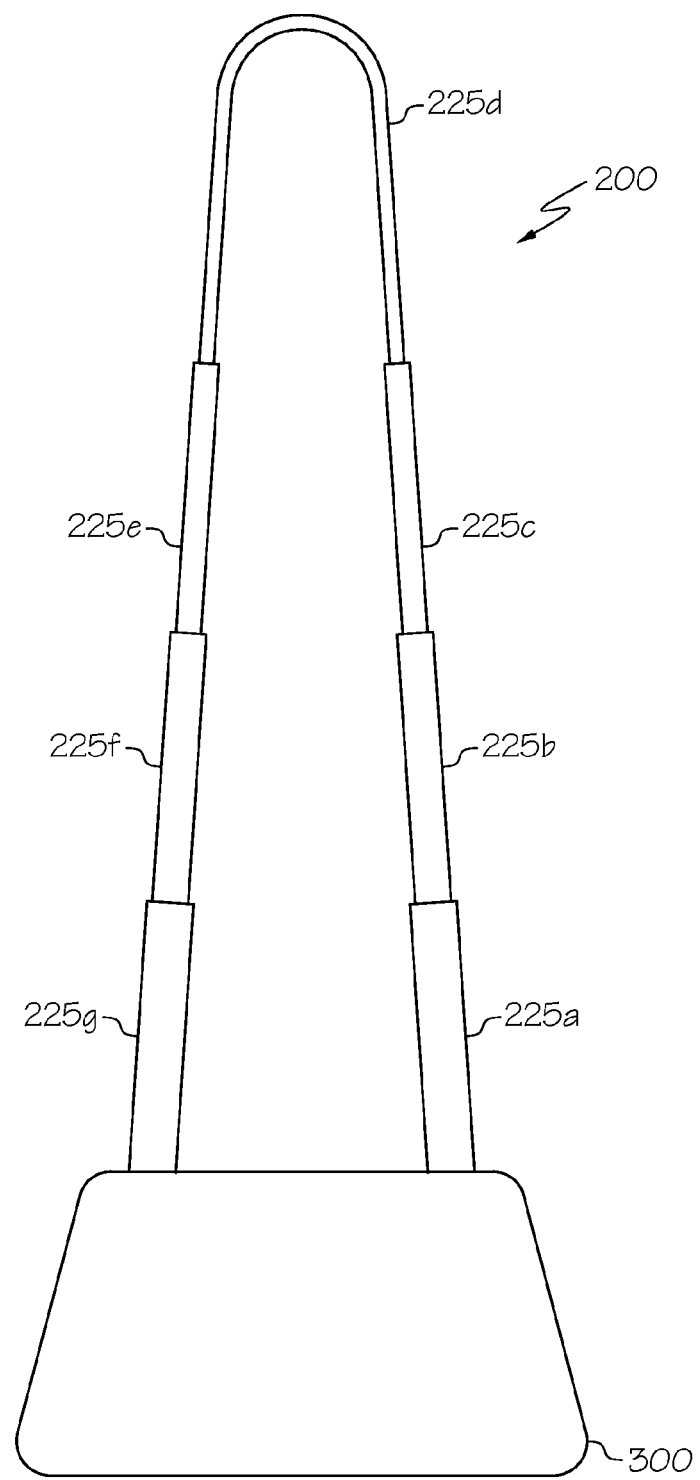
FIG. 6 is a perspective view of a head restraint system, in accordance with an embodiment.

FIG. 6 is a perspective view of a head restraint system 200, in accordance with an embodiment. In an embodiment, the system 200 includes a telescopic vertical support member 225 coupled to a base 300. The head restraint system 200 can further include headwear and a restraining device similar to those described in FIGS. 1-4.

The telescopic vertical support member 225 includes a plurality of tubular member sections 225a-225g, which releasably lock with respect to each other when the telescopic vertical support member 225 is in an extended position. An actuator (not shown) or other mechanism can be adapted to cause the telescoping sections 225a-g, when locked in its extended position, to release, thereby permitting the member 225 to collapse.

For example, the restraining device 120 can include a locking mechanism comprising a washer arrangement which is connected to a pin which interlocks an outer telescoping sleeve, for example, at section 225a, within an inner telescoping sleeve, for example, at section 225b. By depressing a push button operatively connected to the washer, the washer can cause the pin to be withdrawn from the inner sleeve permitting the inner sleeve to be telescopically adjusted within the outer sleeve, thereby providing a "snap-action" feature. Accordingly, the support member 225 can increase in length or decrease in length according to a linear movement of the member sections relative to each other.

Collectively, the member sections 225a-225g form a U-shaped or tapered support member 225. Member sections 225a, b, c are connected between one end to a base 130 and a top member section 225d. Member sections 225e, f, g are connected between another end to a base 130 and the top member section 225d. Also, the member sections 225 extended outwardly from the base 300. In an embodiment, a garment enclosure is provided. When in an operable position, this has a lower portion attached to the base and an upper portion adapted to be folded downwardly or raised upwardly and supported by the tubular members 225 of the pole member when in the extended position characterized in that the pole member is a telescoping pole, which has attachments or the like near its upper end for a releasable attachment to the top of the upper portion for supporting the garment enclosure when the pole is extended.

Figure 7:
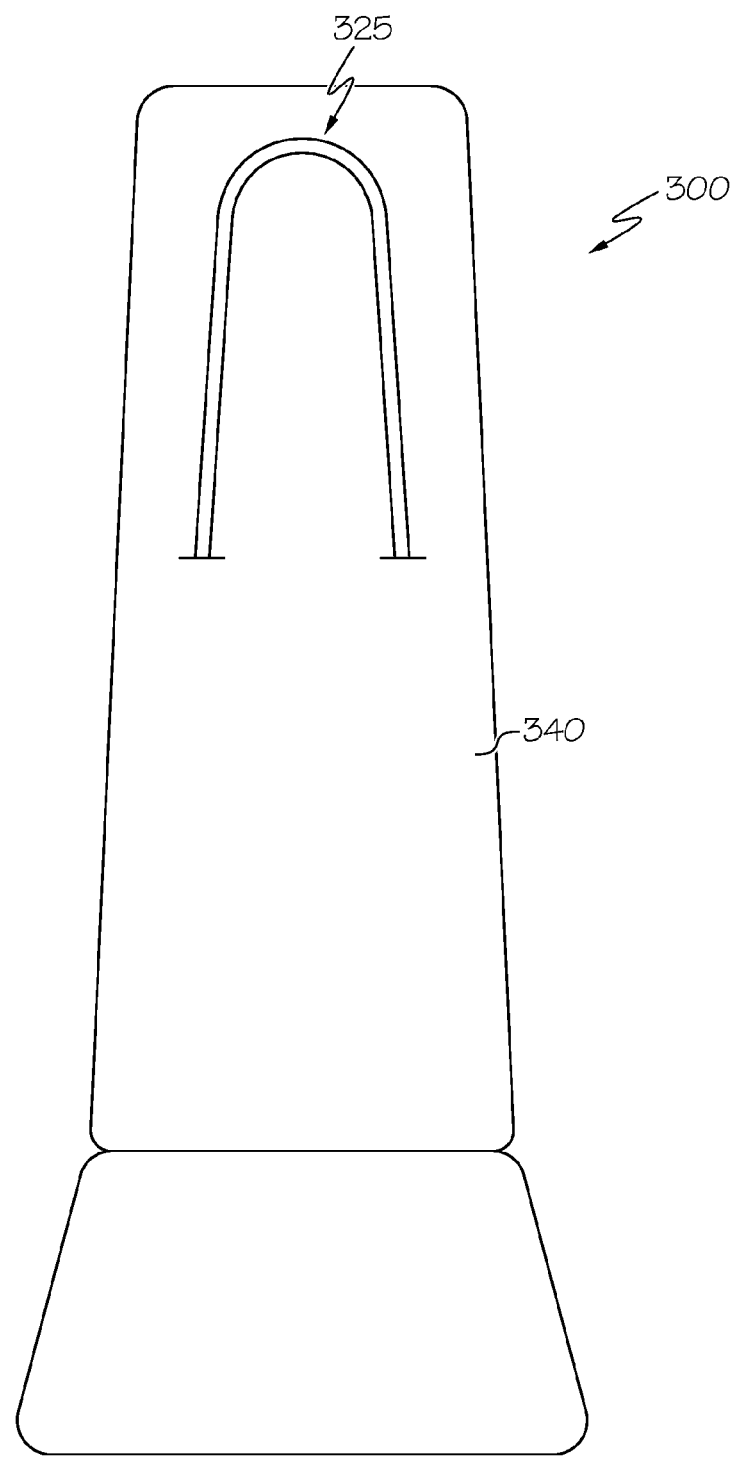
FIG. 7 is a perspective view of a head restraint system, in accordance with an embodiment.

FIG. 7 is a perspective view of a head restraint system 300, in accordance with an embodiment. The system 300 includes a support member 325 that extends from a seat 340, which provides a base for the support member 325. The seat 340 can be a child car seat, booster seat, high chair, swing seat, or other sitting device constructed and arranged to provide a safe sitting arrangement for a child, handicapped person, elderly person, or other person requiring head support to reduce the risk of injury during movement, for example, in a car, train, airplane, swingset, and so on. The support member 325 can be the same as or similar to support members described in FIGS. 1-6, and therefore, details of the support member 325 are not repeated due to brevity. For example, the support member 325 can have a tapered configuration to prevent a restraining device extending from a headwear from sliding down the length of the support member 325. The support member 325 can extend from a back surface of the seat 340, or from a bottom surface, for example, extend from a booster seat.

Figure 8A:
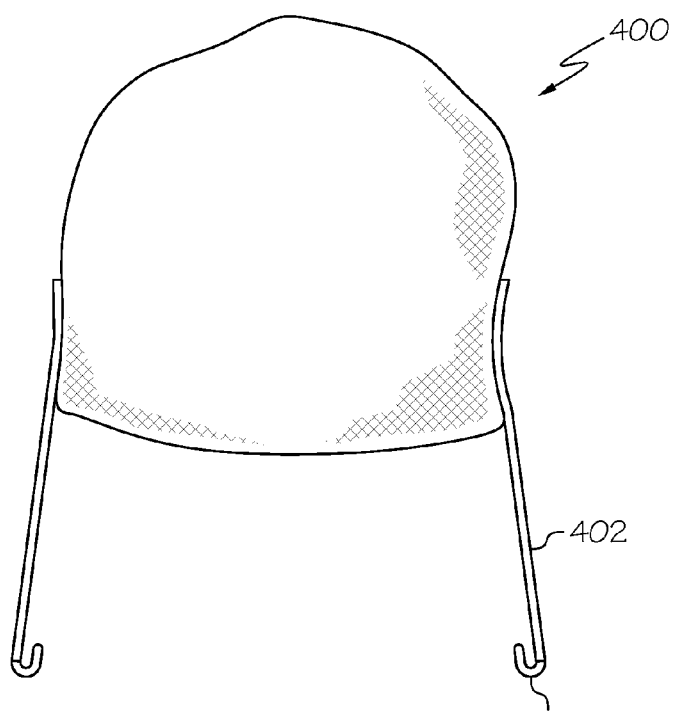
FIG. 8A is a view of a headwear, in accordance with an embodiment.
Figure 8B:
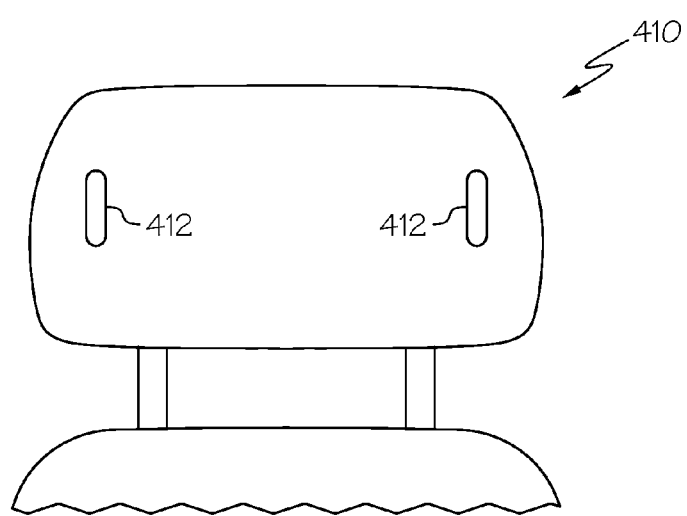
FIG. 8B is a view of a headrest region of a seat constructed and arranged for coupled with the headwear of FIG. 8A, in accordance with an embodiment.

FIG. 8A is a view of a headwear 400, in accordance with an embodiment. FIG. 8B is a view of a headrest region 410 of a seat constructed and arranged for coupled with the headwear 400 of FIG. 8A, in accordance with an embodiment.

In an embodiment, for example, shown in FIGS. 8A and 8B, the headwear 400 can include straps 412 or the like extending from each side of the headwear 400. The straps 412 can be sewed or otherwise coupled to the headwear 400 or be formed of a same material as the headwear 400, for example, knitted to form the configuration of the headwear 400. The straps 412 can each include a hook, clasp, or other fastening device for coupling with an anchor 412 or the like attached to a headrest 410 to hold the wearer's head in place against the headrest 410.

Alternatively, the headrest 410 includes two anchored retractable or non-retractable straps that can extend from the headrest 410. The headrest 410 can include mechanics similar to those of a seatbelt extension mechanism for advancing, retracting, and/or locking the straps. A fastening device such as a buckle, clasp, clip, or the like can be coupled to an end of the straps. The fasteners can hook into loops in the headwear 400 to hold the wearer's head in place against the headrest 410.

Figure 9:
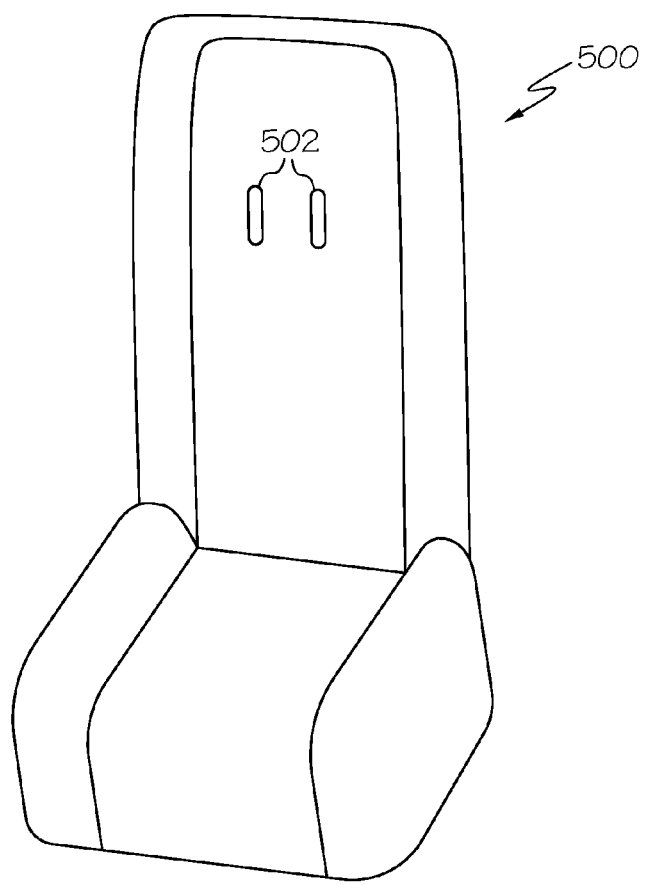
FIG. 9 is a perspective view of a seat, in accordance with an embodiment.
Figure 10:
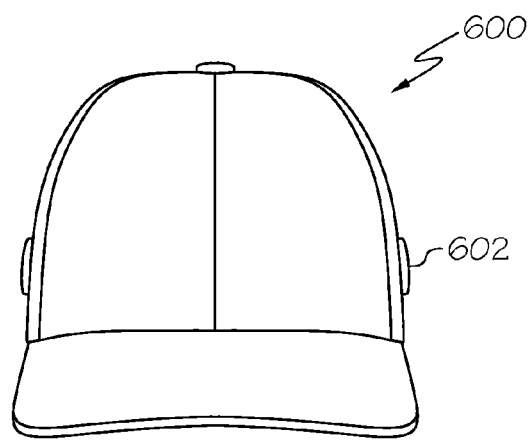
FIG. 10 is a front view of a headwear constructed and arranged for coupling to the seat of FIG. 9, in accordance with an embodiment.

FIG. 9 is a perspective view of a seat 500, in accordance with an embodiment. FIG. 10 is a front view of a headwear 600 constructed and arranged for coupling to the seat 500 of FIG. 9, in accordance with an embodiment. The headwear 600 includes at least two loops 602, each loop on a side of the headwear 600. The loops 602 can be similar to those described in U.S. Pat. No. 8,381,316 incorporated by reference above. The loops 602 can be coupled to an exterior of the headwear 600, for example, a rear surface of the headwear 600, or from an interior surface of the headwear 600.

The seat 500 can be a child car seat or the like. The seat 500 can include at least one retractable strap 502, each including a clasp, buckle, hook, or other mechanism. The loops 602 can serve as anchors, so that each fastening mechanism coupled to a strap 502 can removably couple to a corresponding loop 602 in the headwear 600. When the headwear 600 is positioned on a wearer's head, the strap or straps 502 can hold the wearer's head in place to prevent the head from substantial movement while sleeping in the seat 500.

Figure 11:
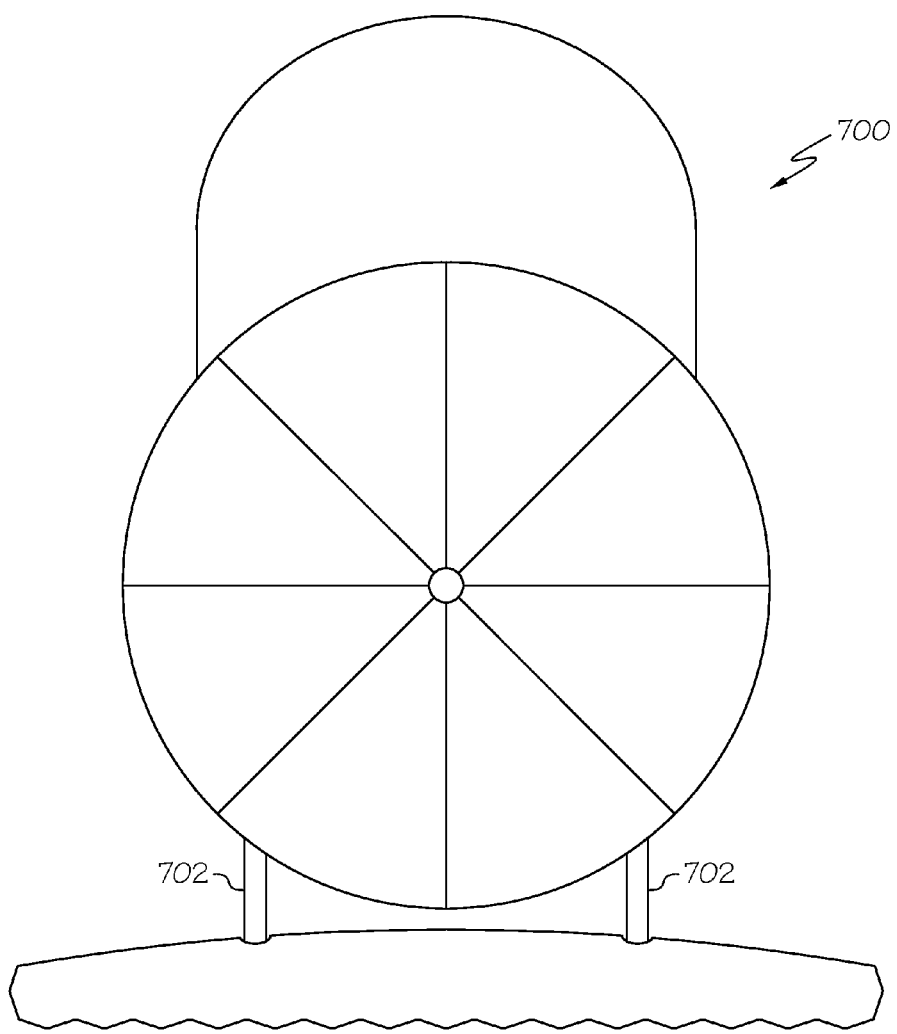
FIG. 11 is a view of a system for restraining a head of a wearer, in accordance with an embodiment.

FIG. 11 is a view of a system 700 for restraining a head of a wearer, in accordance with an embodiment. The system 700 can include at least one support member 702 that extends horizontally from a headrest or other region of a seat. The headwear 700 can include padding (not shown), for example, foam, positioned at a region between each support member 702 and the wearer's head, for example, positioned about a liner in the headwear 700. The curvature of the wearer's head and the cushion of the car seat may further reduce a risk of discomfort from the support members 702 abutting the head. In another embodiment, a cup or the like can be added to the upper portion of the upright to receive the head. A mesh may be added to the lower portion of the upright 125 so a child cannot attempt to put his or her head through the support While embodiments of the head apparel have been described with respect to travelers, who can sleep when seated in a substantially upright position while traveling, the head apparel is not limited to such applications. Other applications are contemplated in which the head apparel is used by people with neck or back injuries, who may be prevented from using their neck muscles to hold their heads in an upright position.

While the invention has been shown and described with reference to specific embodiments, it should be understood by those skilled in the art that various changes in form and detail may be made therein without departing from the spirit and scope of the invention.

What is claimed is:

1. A system for restraining a head of a person, comprising:
   headwear having an outer surface and an opening that exposes an interior surface configured to receive the head of a wearer of the headwear;
   a flexible restraining device having a first end and a second end, each of the first and second ends coupled to the headwear, and a central portion between the two ends;
   an opening between the restraining device and the headwear; and
   a vertical support member extending through the opening, wherein the restraining device accommodates the vertical support member and holds the headwear in place relative to the vertical support member, wherein the support member includes two portions that are separate from each other by a width that gradually increases from a top region of the support member to a bottom region of the support member.

2. The system of claim 1, further comprising a base coupled to a lower portion of the vertical support member, the base constructed and arranged for positioning on a seat.

3. The system of claim 2, wherein the base is integral with the seat.

4. The system of claim 1, wherein the first and second ends of the restraining device are coupled to a rear portion of the outer surface of the headwear.

5. The system of claim 1, wherein the restraining device expands and contracts to accommodate a positioning of the restraining device about the vertical support member.

6. The system of claim 1, wherein the restraining device is constructed and arranged for positioning about a first width of the support member at the top region according to a force, and is prohibited from moving to the bottom region of the support member due to the increasing width of the support member.

7. The system of claim 1, wherein the support member is U-shaped or V-shaped, and wherein each end of the support member is coupled to a base or a frame of a seat.

8. The system of claim 1, wherein the support member includes a plurality of tubular member sections, each having at least one of a telescoping sleeve positioned about a telescoping sleeve of a first adjacent member section and a telescoping sleeve positioned inside a telescoping sleeve of a second adjacent member section, wherein the support member can increase in length or decrease in length according to a linear movement of the member sections relative to each other.

9. The system of claim 1, wherein the support member includes an adjustment mechanism for changing the support member to one or more different positions relative to a vertical axis.

* * * * *